(12) United States Patent
Calhoun

(10) Patent No.: US 7,734,789 B2
(45) Date of Patent: *Jun. 8, 2010

(54) METHOD AND DEVICE FOR TUNNEL SWITCHING

(75) Inventor: Patrice Calhoun, Gurnee, IL (US)

(73) Assignee: 3Com Corporation, Marlborough, MA (US)

( * ) Notice: Subject to any disclaimer, the term of this patent is extended or adjusted under 35 U.S.C. 154(b) by 1992 days.

This patent is subject to a terminal disclaimer.

(21) Appl. No.: 10/265,852

(22) Filed: Oct. 7, 2002

(65) Prior Publication Data

US 2003/0028648 A1 Feb. 6, 2003

Related U.S. Application Data

(63) Continuation of application No. 09/484,647, filed on Jan. 18, 2000, now Pat. No. 6,463,475, which is a continuation of application No. 08/938,243, filed on Sep. 26, 1997, now abandoned.

(51) Int. Cl.
  G06F 15/173 (2006.01)
  G06F 15/16 (2006.01)
  G06F 9/00 (2006.01)
(52) U.S. Cl. .................. 709/227; 709/225; 709/236; 726/15
(58) Field of Classification Search .................. 709/227
  See application file for complete search history.

(56) References Cited

U.S. PATENT DOCUMENTS

| | | | | |
|---|---|---|---|---|
| 5,301,337 A * | 4/1994 | Wells et al. | ................... | 718/104 |
| 5,623,605 A * | 4/1997 | Keshav et al. | ................ | 709/236 |
| 5,774,660 A * | 6/1998 | Brendel et al. | .............. | 709/201 |
| 5,805,803 A * | 9/1998 | Birrell et al. | ................... | 726/12 |
| 5,805,820 A * | 9/1998 | Bellovin et al. | ............. | 709/225 |
| 5,918,019 A * | 6/1999 | Valencia | ...................... | 709/227 |
| 5,926,626 A * | 7/1999 | Takeuchi et al. | ............ | 709/249 |
| 6,061,796 A * | 5/2000 | Chen et al. | ..................... | 726/15 |
| 6,088,687 A * | 7/2000 | Leleu | .......................... | 705/400 |
| 6,108,345 A * | 8/2000 | Zhang | ......................... | 370/445 |
| 6,151,628 A * | 11/2000 | Xu et al. | ...................... | 709/225 |
| 6,154,461 A * | 11/2000 | Sturniolo et al. | ............ | 370/401 |
| 6,335,927 B1 * | 1/2002 | Elliott et al. | ................. | 370/352 |

* cited by examiner

Primary Examiner—William C Vaughn, Jr.
Assistant Examiner—Joiya M Cloud
(74) Attorney, Agent, or Firm—McDonnell Boehnen Hulbert & Berghoff LLP

(57) ABSTRACT

A method and device for providing switched tunnel connections from a user to a destination or a multiple number of destinations. Tunnels are switched from a user to a destination by receiving an incoming tunnel connection from the user and initiating a switched tunnel connection to the destination. Traffic from the incoming tunnel is switched to the destination over the switched tunnel. A disclosed embodiment uses user information to determine the switching of the tunnel to implement security access to a tunnel destination, load balancing among destination resources, and bundling of tunnel sessions to implement high bandwidth transmission.

14 Claims, 10 Drawing Sheets

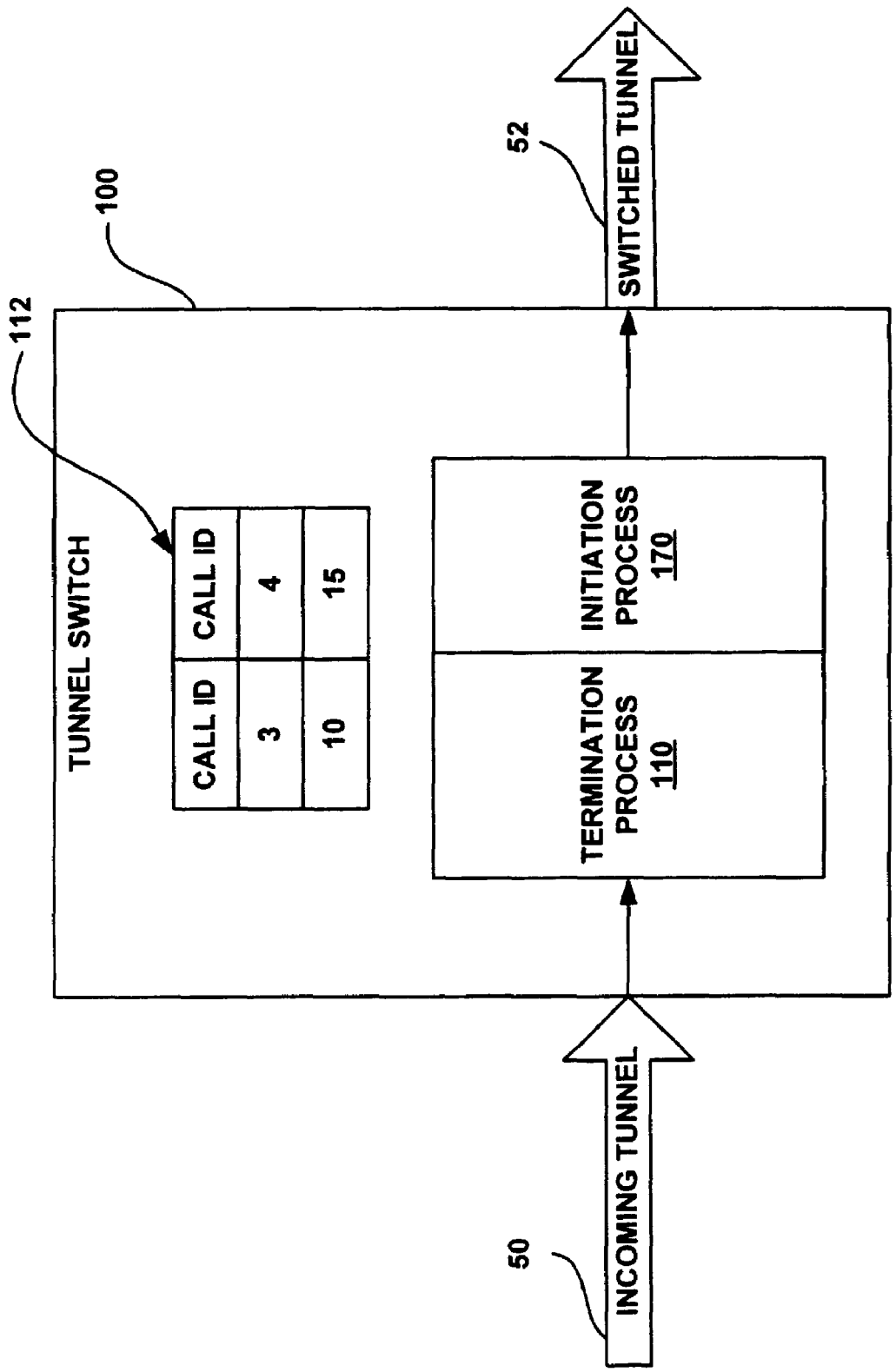

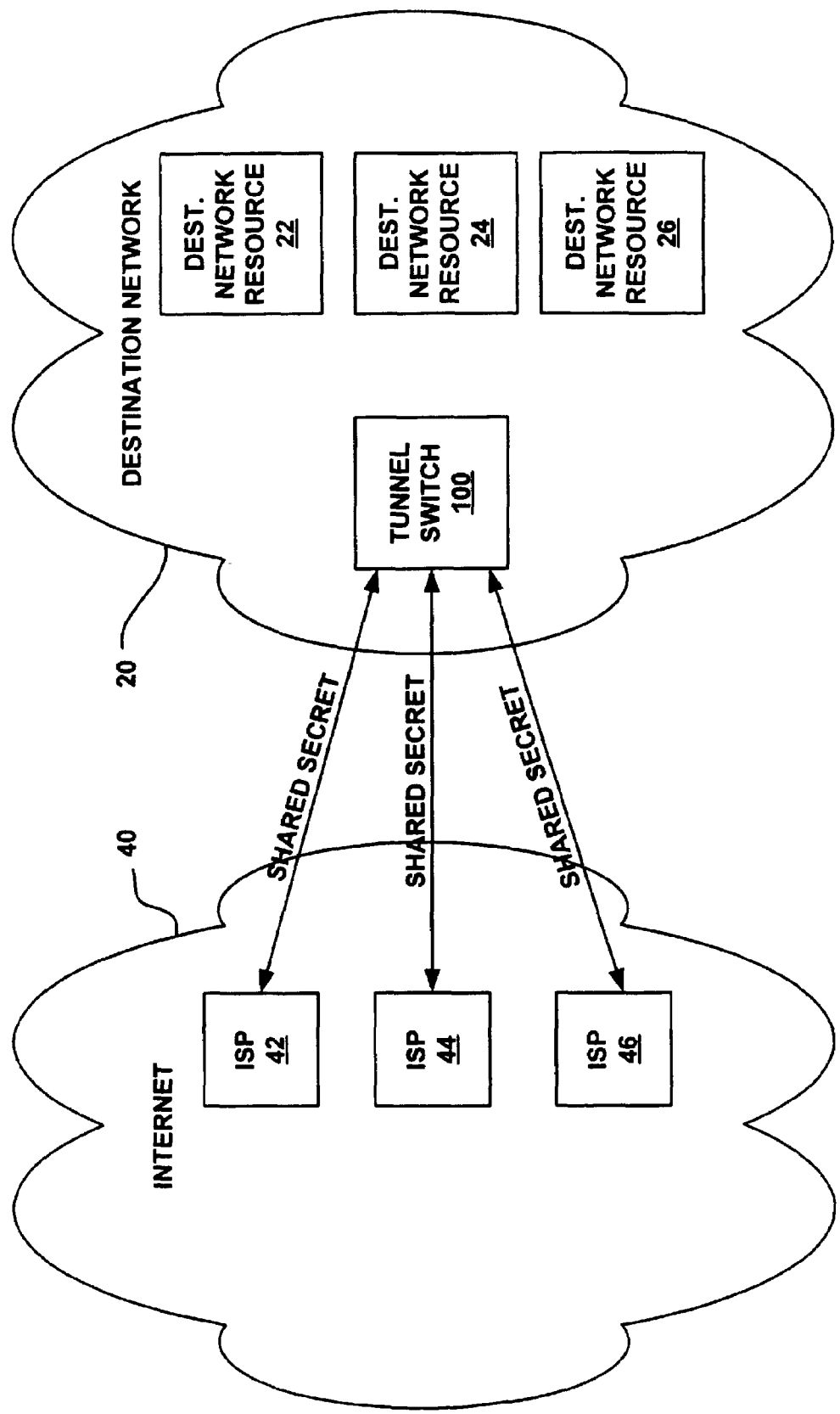

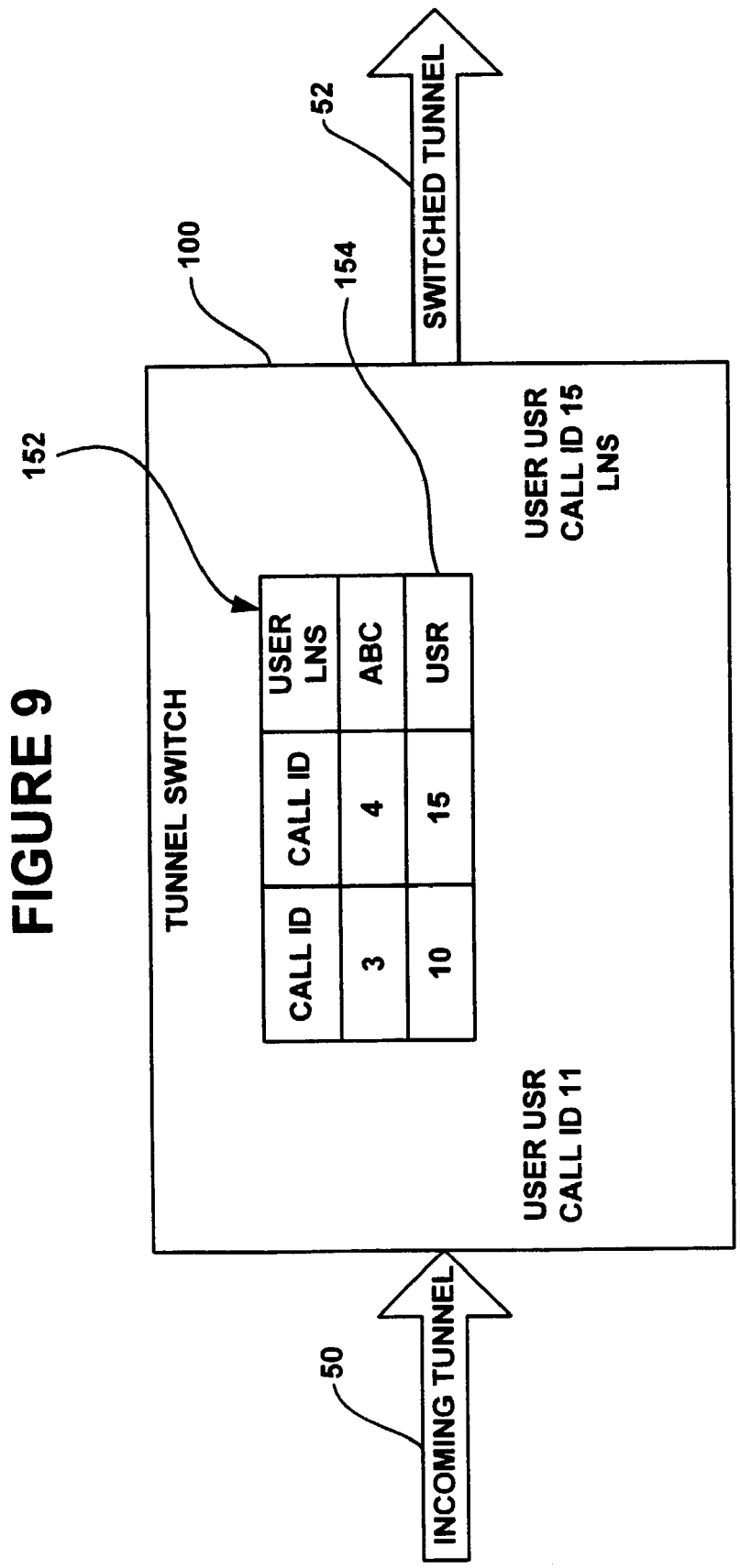

METHOD AND DEVICE FOR TUNNEL SWITCHING

This is a continuation of prior application Ser. No. 09/484,641, filed Jan. 18, 2000, now U.S. Pat. No. 6,463,475, issued Oct. 8, 2002, which is a continuation of prior application Ser. No. 08/938,243, filed Sep. 26, 1997 now abandoned.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

The present invention relates to a method and device for switching network tunnel connections.

B. Description of the Related Art

A tunnel connection allows a user to access a destination network via an intermediate network such as the public Internet. For example, as seen in FIG. 1, a remote user 10 traveling in San Diego, Calif. wishes to connect to a destination network 20 at his home in Chicago, Ill. Typically, the remote user 10 would place a long distance telephone call over the public switched telephone network to Chicago to directly access the destination network 20 on a dial up access connection.

If the destination network has an Internet access 22, however, a tunnel connection through the Internet 40 may be used to access the destination network 20. To initiate a tunnel connection, the remote user 10 places a local telephone call 12 through the public switched telephone network ("PSTN") 30 and Internet Service Provider ("ISP") 42 local point-of-presence in San Diego. In this example, the remote user 10 would be a subscriber to a national ISP 42 with a local dial up access in San Diego. Upon being accessed by the remote user 10, the ISP 42 searches its subscriber database to identify the destination network 20 associated with the remote user 10. To reach the destination network 20, the ISP 42 recognizes the remote user 10 requires a connection or "tunnel" over the Internet 40 to the destination network 20. The ISP 42 forms a tunnel connection 50 to the destination network 20 by sending data from remote user 10 to the Internet access point address of the destination network 20. Data sent to the remote user 10 is thus tunneled across the Internet 40 to the destination network 20. The tunnel connection 50 across the Internet 40 thus allows remote access to the destination network 20 by placing a local telephone call.

Such a tunnel connection 50 over the public Internet 40, however, typically requires the destination network 20 to allow public Internet access. In order for the tunnel connection to be established from the ISP 42 to the destination network 20, the destination network 20 usually must typically have a Internet address that is accessible from the ISP 42. The destination network 20 is therefore publicly accessible, without the ability to control access and maintain information secure and protected during tunneling access. Thus, information that the destination network 20 wishes to maintain protected is typically not made accessible to tunnel connections over the public Internet 40.

In addition, the destination network 20 may have a number of resources 22, 24, 26 to accommodate a large number of incoming remote users. The ISP 42 creating tunnels to the destination network 20, however, typically controls the establishing of tunnels to the destination network 20. The destination network has no control over which of its resources 22, 24, 26 are used to handle the incoming tunnel traffic. Thus, a number of ISPs 42, 44, 46 may be directing incoming tunnels to only one of a destination network's available resources 22, 24, 26. This busy resource may suffer from congestion, while the destination network's other resources are underutilized.

Accordingly, it is desirable to have the ability to consolidate the control of tunnel access to a destination network for security reasons, as well as, to direct the routing of incoming tunnels to a particular access point of the network. Consolidating control of tunnel access to a destination network also provides other benefits as will be apparent.

SUMMARY OF THE INVENTION

The present invention provides switched tunnel connections from a user to a destination or a multiple number of destinations. The present invention determines the appropriate destination for switching incoming tunnel connections based on information relating to the user originating the incoming tunnel. A switched tunnel is then initiated to switch tunnel traffic to the appropriate destination. For example, the present invention may determine from the information relating to the originating user that a switched tunnel connection should be initiated to a destination associated with the originating user.

The present invention provides the ability to impose a security verification on users before initiating a switched tunnel connection to access to the destination. Before allowing access, the originating user of the incoming tunnel is verified to have the proper permission to access the destination. If the user does not have the proper permission, access is denied and the switched tunnel connection is not initiated. The ability to grant either public or private access can be achieved by verification of permissions before switching a tunnel to the destination. Authentic users can be switched to the private access point by initiating a switched tunnel connection. Unauthenticated users are terminated at the public access point and not switched to the destination. By verifying users, controlled access to protected information can be provided by switching tunnels over the public Internet.

The present invention also provides load-balancing to a destination having a multiple number of access points by intelligent switching. Load balancing is achieved by intelligently determining the access points to which switched tunnels are initiated. For example, if the destination has a multiple number of access points, the present invention may switch switched tunnel connections to one of the destination access points based on round robin selection between the available access points. The present invention may also switch switched tunnel connections to one of the destination access points based on the traffic load at the access points. Intelligently switching switched tunnel connections to share traffic load among multiple access points can reduce congestion at the destination.

The present invention also allows the switching of a plurality of tunnels from a user to bundle together a plurality of tunnels from the same user to the destination. The term "bundle", as used herein, is intended to mean a collection of connections or links used collectively for a communication session. To achieve the high bandwidth bundling offered by protocols such as Multi-link PPP, tunnels from the same user must be routed to the same destination. If the switch has already established a switched tunnel to the destination for that user, subsequent incoming tunnel traffic to that destination can be switched over the existing switched tunnel. Thus, a plurality of incoming tunnel connections are bundled together over a switched tunnel connection.

In the described embodiment, a method is provided for establishing a communication link from an originating user to a destination by receiving an incoming tunnel connection, and based on information about the originating user, initiating a switched tunnel connection for switching traffic from the incoming tunnel connection to the destination over the switched tunnel. A database of information or user profiles relating to the originating users is provided and queried for information relating to establishing the communication link to the appropriate destination. Also provided is a tunnel switching device having a process for terminating an incoming tunnel connection, a dispatch process for determining whether a switched tunnel connection is to be made, and an initiation process to initiate a switched tunnel connection for switching traffic between the user and the destination. The tunnel switching device switches the incoming tunnel address to a switched tunnel to access the appropriate destination according to the dispatch process.

BRIEF DESCRIPTION OF THE DRAWINGS

The foregoing and other objects, features and advantages of the present invention will be more readily appreciated upon reference to the following disclosure when considered in conjunction with the accompanying drawings, in which:

FIG. 7 diagrams a security access implementation using the tunnel switch of FIG. 2;

FIG. 9 diagrams the bundling of tunnel connections provided by the tunnel switch of FIG. 2.

DETAILED DESCRIPTION OF THE PREFERRED EMBODIMENT

Figure 1:
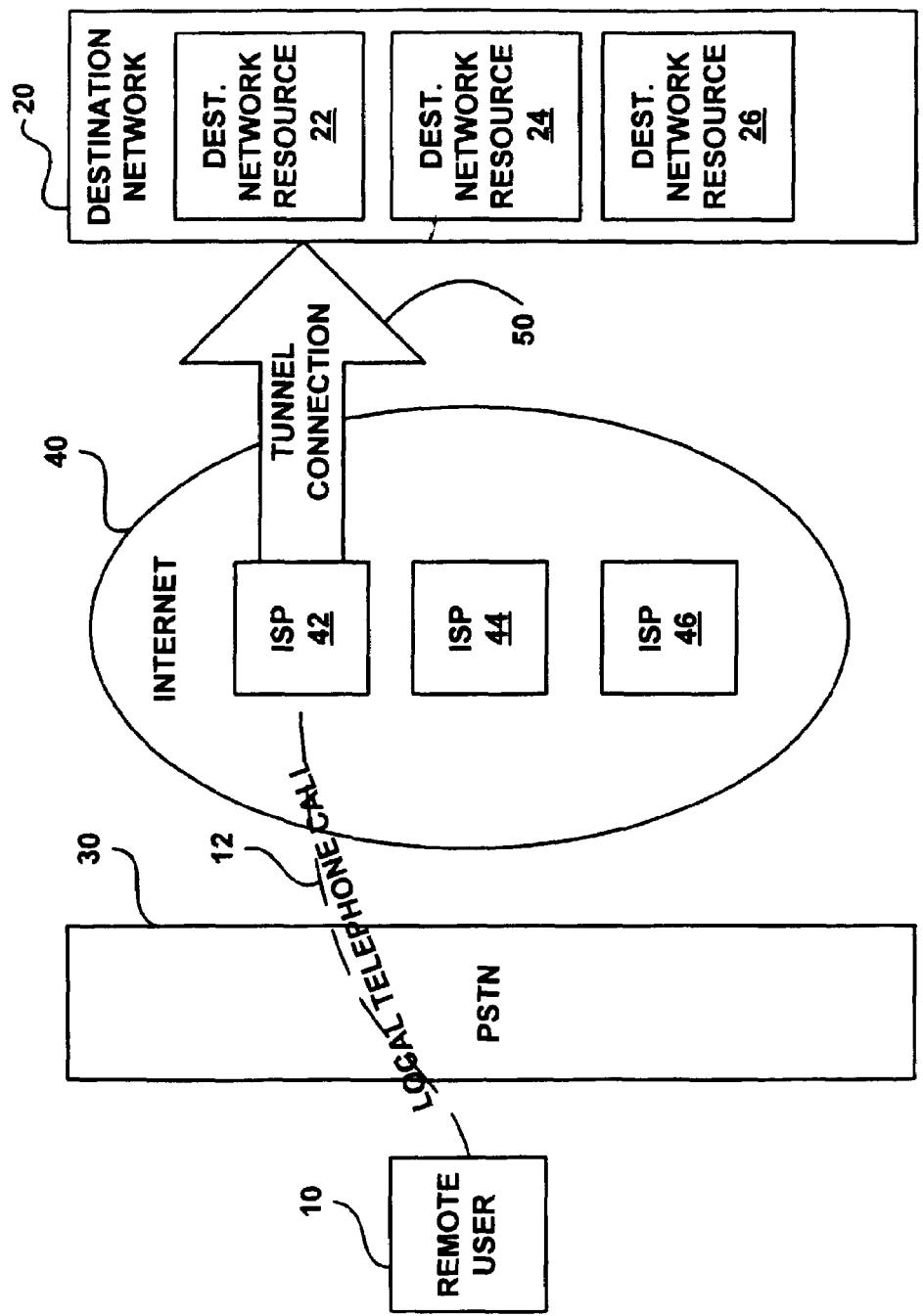
FIG. 1 is an overall system diagram of the prior art tunnel connection over the Internet to a destination network.
Figure 2:
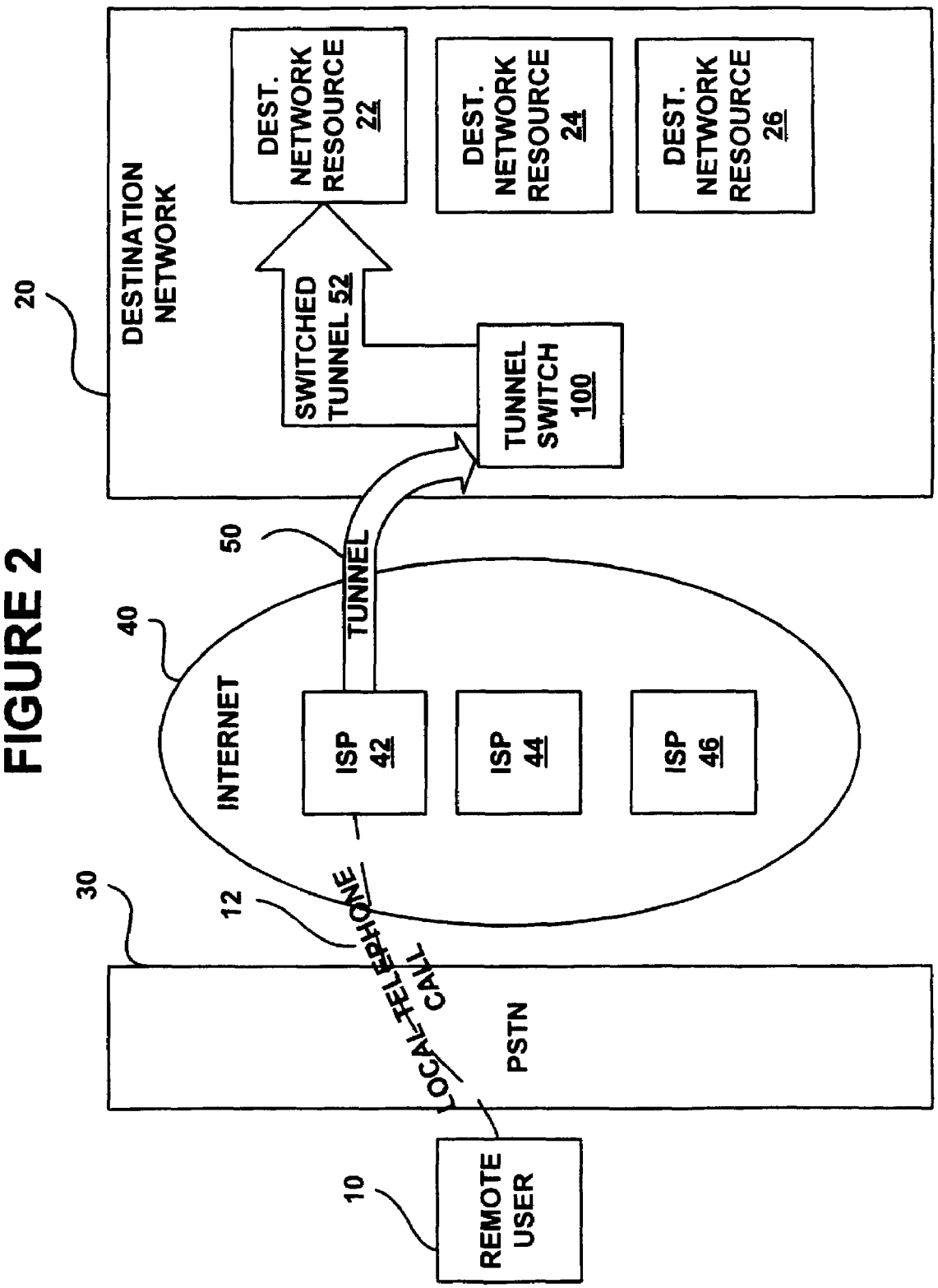
FIG. 2 is an overall system diagram of a switched tunnel connection over the Internet using the present embodiment of the tunnel switch.

FIG. 2 shows a diagram of a tunnel 50 connection over the Internet 40 to a destination network 20 using the tunnel switch 100 of the present embodiment. To initiate a tunnel connection 50 to the destination network, the remote user 10 places a local telephone call 12 through the PSTN 30 to an ISP 42 local point of presence. Preferably, the remote user uses a Point-to-Point Protocol ("PPP") to transmit data traffic over the call 12. The ISP 42 searches its subscriber database to identify the destination network 20 associated with the remote user 10. The ISP 42 typically examines the name of the remote user 10, the telephone number from which the call was received, or the called telephone number to identify the associated destination. For example, the calling or called party telephone number can be obtained by Automatic Number Identification ("ANI") or in a Dialed Number Information String ("DNIS") which is passed along from the PSTN 30.

To reach the destination network 20, the ISP 42 recognizes the remote user 10 requires a tunnel over the Internet 40 to the destination network 20. If a tunnel to the destination network 20 does not already exist, the ISP 42 forms an incoming tunnel connection 50 to the tunnel switch 100 of the destination network 20. ISP 42 ordinarily uses a number of L2TP Access Concentrator ("LAC") using PPP to establish the tunnel connection 50. The destination network 20 may have a number of destination network resources 22, 24, 26 that use a number of L2TP Network Servers ("LNS") to receive the tunnel connection 50. Thus a tunnel can be thought of as a LAC-LNS pair. Using the tunnel 50, data from the remote user 10 is tunneled across the Internet 40 to the tunnel switch 100. Data from remote user 10 is sent to the tunnel switch 100 of the destination network 20.

In the preferred embodiment of the invention, the tunnel connection is implemented using the Layer 2 Tunneling Protocol ("L2TP") and Point-to-Point Tunneling Protocol ("PPTP") a standard communication protocol. L2TP is designed to be largely independent of the media over which the tunnel is established to create packet-oriented point-to-point connectivity on the media. Examples of such media are UDP, Frame Relay Virtual Circuits, or X.25 Virtual Circuits. In addition to L2TP, other tunneling protocols may be used such as Point-to-Point Tunneling Protocol ("PPTP") or Layer 2 Forwarding ("L2F").

The tunnel switch 100 provides access to the destination network 20 by initiating a switched tunnel 52 to switch traffic from the incoming tunnel 50 to the destination network resources 22, 24, 26. The tunnel switch 100 switches traffic from the incoming tunnel 50 to the desired resource 22, 24, 26 over the switched tunnel 52. Thus the tunnel switch 100 provides control of tunnel access to the destination network 20. The destination network resources 22, 24, 26 may take different forms such as a host providing a service such as a FTP server or an LNS providing access to an Ethernet Network, ATM or Token Ring Network.

Figure 3:
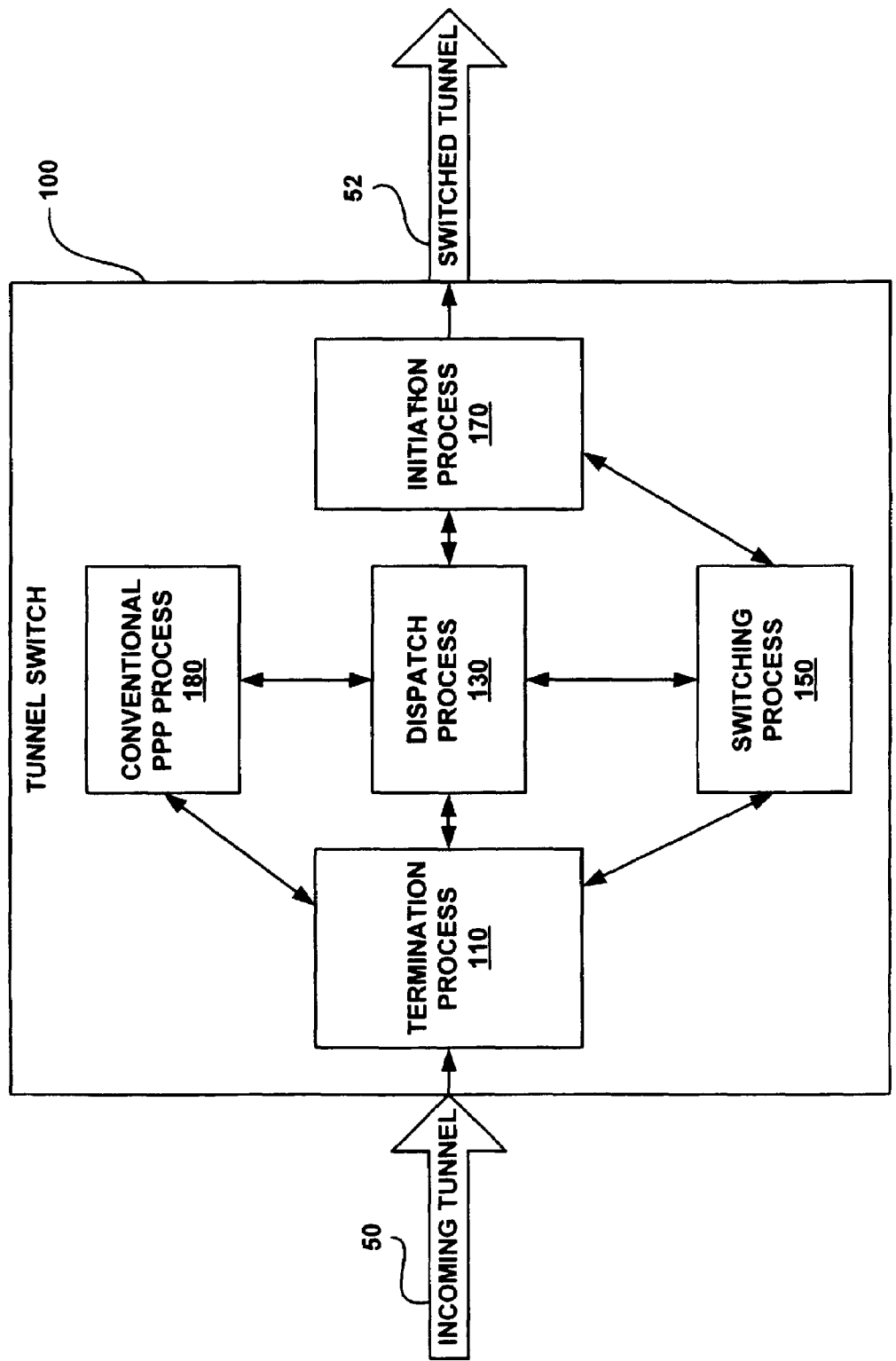
FIG. 3 shows a block diagram of the present embodiment of the tunnel switch of FIG. 2.

Referring to FIG. 3, the present embodiment of the tunnel switch 100 includes a termination process 110, a dispatch process 130, a switching process 150, and an initiation process 170. Also shown is a conventional PPP process 180 for connecting or terminating tunnels that are not switched. The incoming tunnel connection 50 is received by the termination process 110. It is understood that the incoming tunnel connection 50 may be carrying a number of user sessions. The incoming tunnel connection 50 is also associated with a tunnel identifier and an unique caller identification ("Call D") to identify the tunnel session. The termination process 110 may also be referred to as a L2TP Network Server ("LNS") process in the preferred embodiment.

Upon receiving an incoming tunnel 50, the termination process 110 sends a message to the PPP process 180 that an incoming tunnel connection 50 has arrived. The PPP process 180 queries the dispatch process 130 to determine if the incoming tunnel 50 is to be switched to a switched tunnel 52. If the tunnel is not to be switched, PPP process 180 may handle the call. The PPP process 180 is conventional and known to those skilled in the art. If the incoming tunnel 50 is to be switched to the switched tunnel 52, traffic is switched to the L2TP module to initiate an incoming call request. In another embodiment, the termination process 110 initiates a query to the dispatch processes 130 to determine whether a switched tunnel connection is to be made.

The dispatch process 130 consults a database through the user manager process (not shown) to determine if a switched tunnel request is to be initiated. The user manager process to access the database of information containing user information or user profile information is conventional and known to those skilled in the art. For example, standard protocols to retrieve user profiles are defined in Internet Engineering Task Force publication RFC2138 which is incorporated by reference. In the preferred embodiment, the user profile contains information about the security permission that the user is allowed to access.

If a switched tunnel 52 is to be initiated, the dispatch process 130 also determines the proper destination for the switched tunnel. The dispatch process 130 can use either the DNIS/ANI or user credentials information within the L2TP tunnel message or some other local policy configuration to determine that a switched tunnel is required. For example, the user information may direct the dispatch process 130 to switch the incoming tunnel 50 from a user to a specific destination. Alternatively, the tunnel traffic from a particular telephone number determined by ANI or DNIS may be directed to a selected destination, or a local policy configuration may require that all users be switched to a set of resources.

In the preferred embodiment, the dispatch process 130 also maintains status information about each of the switched tunnels or sessions. Typically the originating user, caller identifier, and other tunnel statistics are maintained to determine the switching of tunnels as described further below.

Once the dispatch process 130 has determined that the tunnel must be switched, the switching process may optionally use innovative methods to intelligently determine the tunnel destination. Such methods may involve round robin load balancing among a multiple number of destination resources or LNSs, keeping the number of active session for each resource, or it may use a proprietary protocol to determine the load of each LNS. The dispatch process 130 may also implement a security authentication or verification to determine whether the user originating the incoming tunnel has the proper permission to access the destination. These applications of the tunnel switch will be discussed in more detail below.

After the dispatch process 130 determines the destination of the switched tunnel, the switching process 150 establishes the transfer of traffic from the incoming tunnel 50 to the switched tunnel 52. The termination process 110 informs the switching process 150 (on behalf of the dispatch process 130) that a tunnel session is to be established. The switching process 150 sends a message to the initiation process 170 to create a switched tunnel 52 to the appropriate destination. The switched tunnel 52 is initiated in a conventional manner according to L2TP. Preferably, incoming tunnel traffic is re-encapsulated using L2TP with the address for the destination of the switched tunnel 52 as determined by the dispatch process 130. The switching process 150 transfers the re-encapsulated traffic to the initiation process 170 to initiate the switched tunnel 52.

Figure 4:
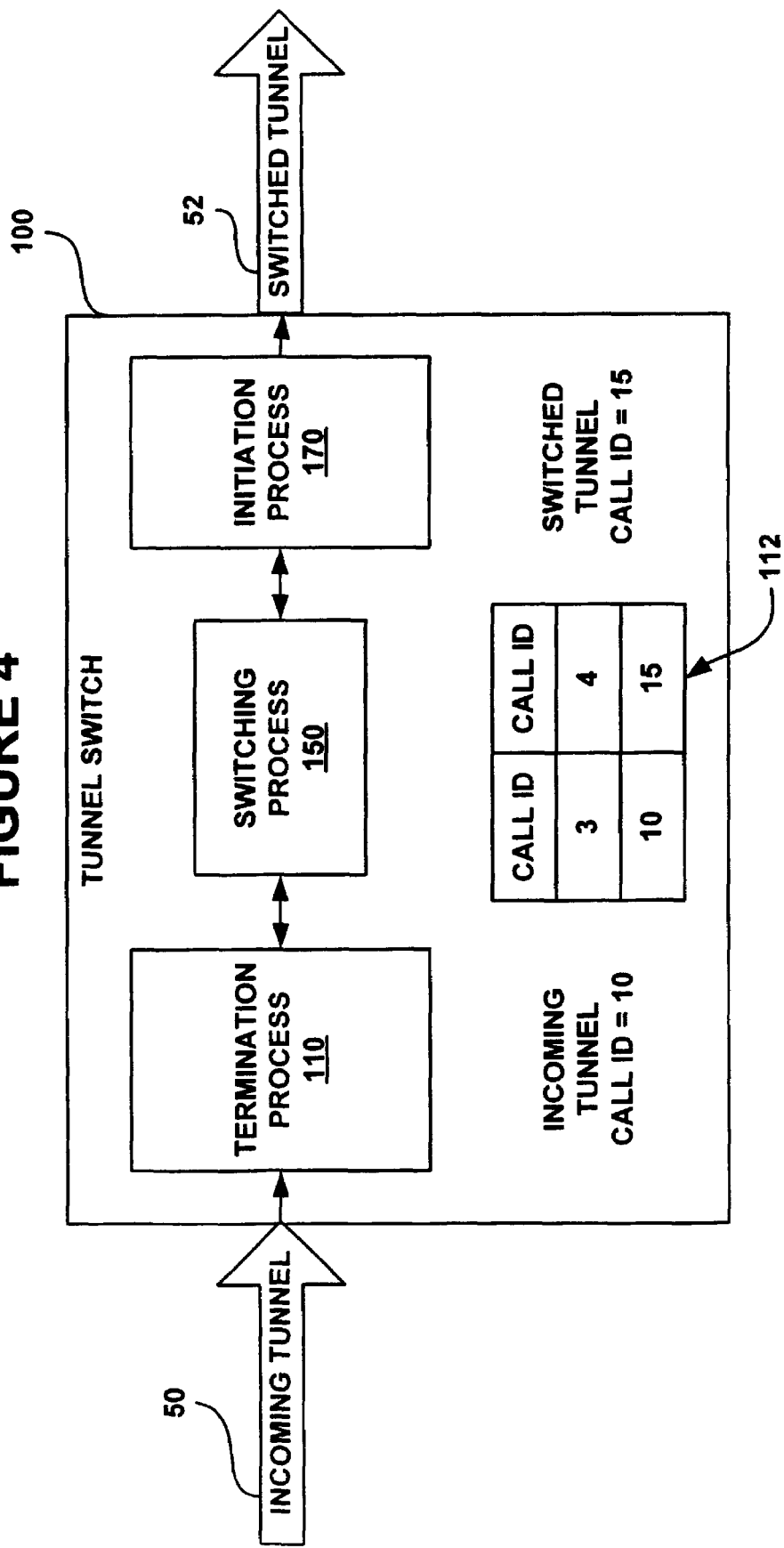
FIG. 4 shows a diagram of the switching function of the tunnel switch of FIG. 2.
Figure 5:
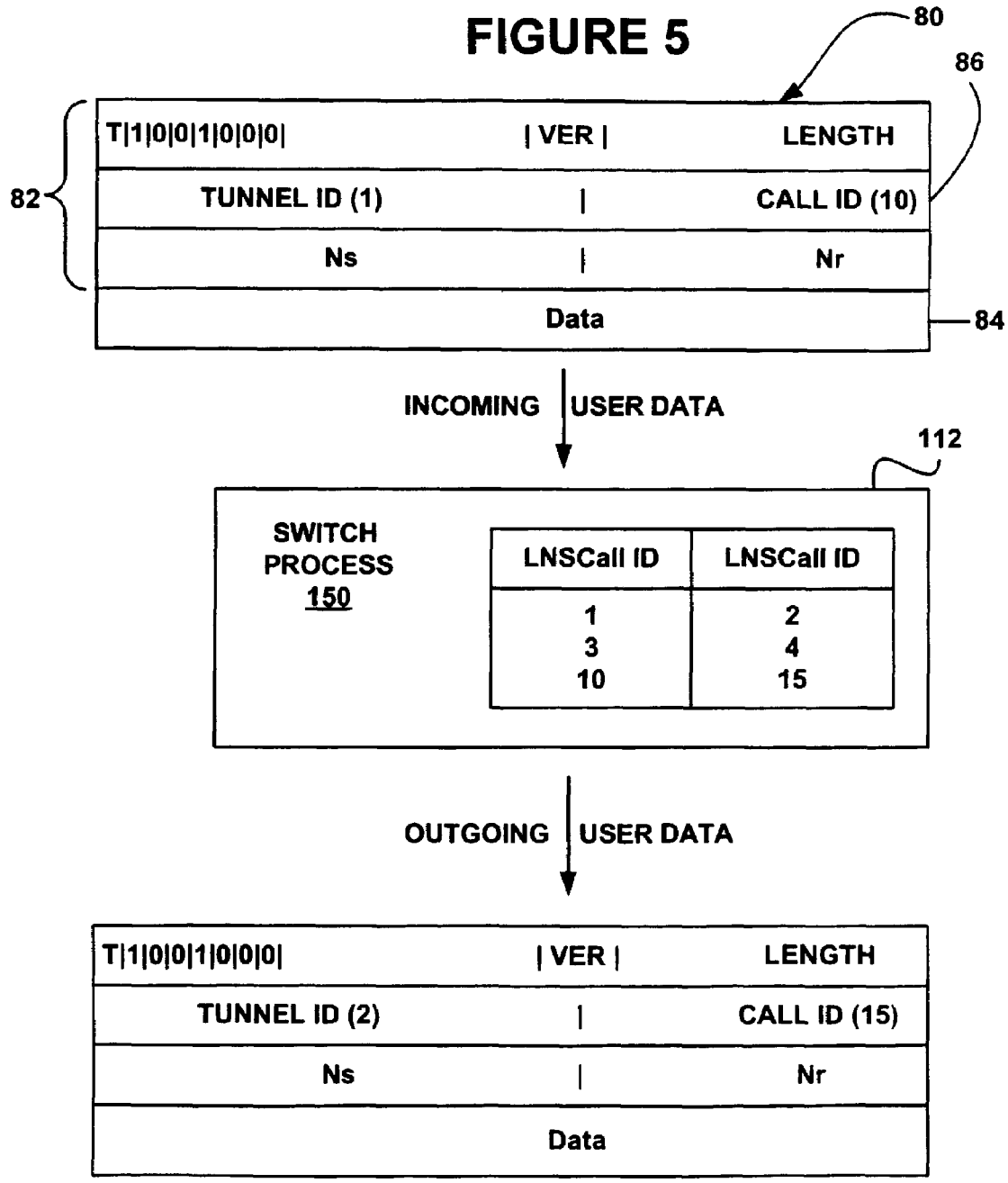
FIG. 5 shows a diagram of the switching of a L2TP packet which carries traffic in the system of FIG. 2.

In an illustrative embodiment, the switching process 150 switches the tunnel traffic. Once the initiation process 170 confirms to the switching process 150 that the switched tunnel 52 has been established, the switching process 150 uses both the incoming tunnel 50 and the switched tunnel 52 call identifiers to correlate traffic from the incoming tunnel 50 to the switched tunnel 52 and vice versa. For example, in FIG. 4 the incoming tunnel 50 may be associated with a call identifier value of 10 while the switched tunnel 52 is associated with a call identifier value of 15. The switching process 150 switches traffic from the incoming tunnel 50 with a call identifier value of 10 to the switched tunnel 52 with the call identifier value of 15. Preferably, the switching can be implemented with lookup table 112. FIG. 5 shows a L2TP packet being switched as described above. The packet 80 includes a header 82 and a data payload 84. The call identifier ("Call ID") 86 uniquely identifies tunnel traffic from a user to a destination. As described above, the look up table 112 switches the Call ID 86 from a value of 10 to a value of 15. Preferably, a Tunnel identifier is also switched. In the example of FIG. 5, the Tunnel Identifier is switched from a value of 1 to a value of 2.

Figure 6B:
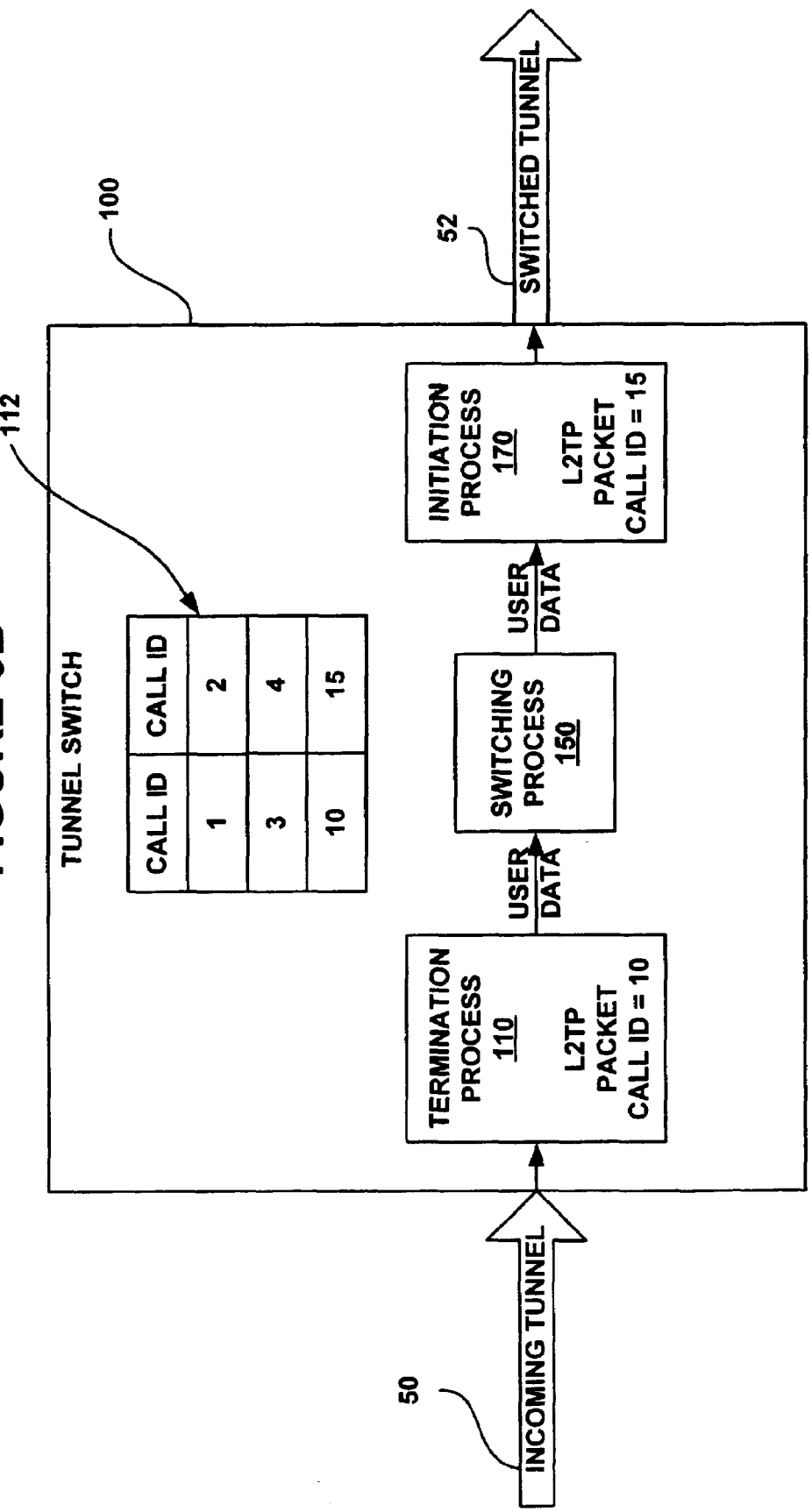
FIGS. 6(*a*) and 6(*b*) shows diagrams of the switching function of the tunnel switch of FIG. 2.

In a preferred embodiment, the termination process 110 receives encapsulated user data traffic and switches the traffic between the tunnels to the destination. The termination process 110 has two alternative methods for switching traffic. In the most preferred method shown in FIG. 6(a), the termination process 110 changes the call identifiers to the call identifier of the switched tunnel 52. The Tunnel Identifiers are also switched as described previously. The encapsulated traffic with the switched tunnel call identifier is then passed to the initiation process 170 to forward on to the destination over the switched tunnel 52. An alternate method shown in FIG. 6(b) is for the switching process 150 to receive tunnel traffic and forward the data to the initiation process 170 with the relevant call identifier. In this case, the initiation process 170 re-encapsulates the data with the appropriate tunnel headers to reach the destination. The re-encapsulation method is more computationally intensive than simply changing the call identifiers. This mechanism is also valid in the reverse direction.

Described below is pseudo code for implementing the basic functions of the tunnel switch. The information relating to the tunnel sessions is maintained in a software structure including:

```
Struct switchConnection {
        INT16         connectionState;
        INT16         LACCallId;
        INT16         LNSCallId;
        INT32         LNSAddress;
        UCHAR         userName[2048];
        Void          *next;
        }
```

| #define | CONNECTION_IDLE | 0 × 0 |
| #define | CONNECTION_ALLOCATED | 0 × 1 |
| #define | CONNECTION_ESTABLISHED | 0 × 2 |

In addition to the connection status of the tunnel (connectionState), the call identifiers (LACCallId), the destination address (LNSAddress) and the name of the user (userName) is maintained.

The switched tunnel 52 is initiated using this software structure as follows: SwitchIncomingSession(INT16 LNSCallId, UCHAR sessionUserName)
  Verify User Credentials
    If Failure, Terminate Tunnel
  Retrieve User Profile
  Allocate switchConnection structure
  Initialize switchConnection→connectionState to CONNECTION_ALLOCATED
  Find Available LNS (22, 24, 26)
    If Available in User Profile. Use User Profile
    Otherwise, Next Available LNS
  Set switchConnection→LNSCallId to LNSCallId Set switchConnection→LNSAddress field to available LNS address
  Copy sessionUserName field to switchConnection→userName
  Add structure to linked list
  initiate Tunnel to switchConnection→LNSAddress Confirmation that the tunnel has been properly established proceeds as follows: SwitchLNSEstablished(INT16 LAC-CallId, INT16 resultCode)
  Find appropriate switchConnection structure
  If resultCode is not set to success, either find a new LNS to connect to or disconnect the tunnel using switchConnection→LNSCallId
  If resultCode is successful,
    Set switchConnection→LACCallId to LACCallId
  Set switchConnection→connectionState to CONNECTION_ESTABLISHED Traffic is switched from the incoming tunnel to the switched tunnel as follows: SwitchIncomingData (INT16 LNSCallId, INT16 LACCallId, UCHAR *data, UCHAR length)
  If LNSCallId is set
  Find the switchConnection structure using the LNSCallId field
  Pass the LNSCallId, data pointer and length to the Initiation process (170)
  If LACCallId is set
  Find the switchConnection structure using the LACCallId filed
  Pass the LACCallId, data pointer and length to the termination process (110)

The tunnel session can also be disconnected if the user or destination has closed the connection or a network error has occurred:

SwitchSessionTerminated (INT16 LNSCallId, INT16LACCallId)
  If LNSCallId is set
  Find the switchConnection structure using the LNSCallId field
  Inform the initiation process (170) that the session has been disconnected
  If LACCallId is set
  Find the switchConnection structure using the LACCallId field
  Inform the termination process (110) that the session has been disconnected
  Set switchConnection→connectionState to CONNECTION_IDLE
  Remove switchConnection from the linked list
  Free the switchConnection structure.

In the representative embodiment, the described software is implemented in the C programming language to run on the PSOS real-time operating system. The C software is compiled to run on a PowerPC processor with 64 Megabytes of RAM. The compiled C software may be stored in firmware. An example of such hardware is HIPERARC available from 3Com Corporation 8100 North McCormick Boulevard, Skokie, Ill. 60076 Of course, a wide variety of processors and systems may be used.

The tunnel switch of the present embodiment has many uses and advantages as apparent to those skilled in the art. The tunnel switch consolidates access and control of incoming tunnels to the destination network. The tunnel switch can thus maintain the status of all tunnels coming into the destination and control the switching of tunnels based on this information.

FIG. 7 diagrams the security access provided by the tunnel switch 100 of the present embodiment. With a tunnel switch 100, the number of shared secrets necessary to implement security access is minimized because access from the ISPs 42, 44, 46 is consolidated into the tunnel switch 100. Thus, each ISP 42, 44, 46 need not share a secret with each destination 20 or resource 22, 24, 26, only the tunnel switch 100. Because tunneling protocols such as L2TP provide an authentication mechanism, the tunnel switch allows the number of shared secrets to configure to be minimized. The tunnel switch considerably simplifies the implementation of security access to the destination network. Prior art implementations of security access using L2TP without a tunnel switch requires each tunnel combination between the ISPs 42, 44, 46 and destination 20 or resource 22, 24, 26 to have a common secret. As a result, the number of required secrets is much larger.

FIG. 7 also shows that the ISPs 42, 44, 46 only needs to know about the tunnel switch 100 to access the destination network 20. The tunnel switch 100 consolidates tunnel access to the destination network 20 to allow the destination network to modify the allowed access and change network resources independently of the ISP. With a tunnel switch 100 controlling access to the destination resource 20, the ISPs 42, 44, 46 only needs to the direct incoming tunnels to the tunnel switch. The tunnel switch 100 is then responsible for switching the incoming tunnel to the appropriate network destination. This simplifies the task of the ISP 42, 44, 46 and allows the destination network 20 to add or remove new network resources 22, 24, 26 without notifying the ISPs 42, 44, 46. Changes to the destination 20 and network resources 22, 24, 26 are thus transparent to the ISPs 42, 44, 46.

Figure 8:
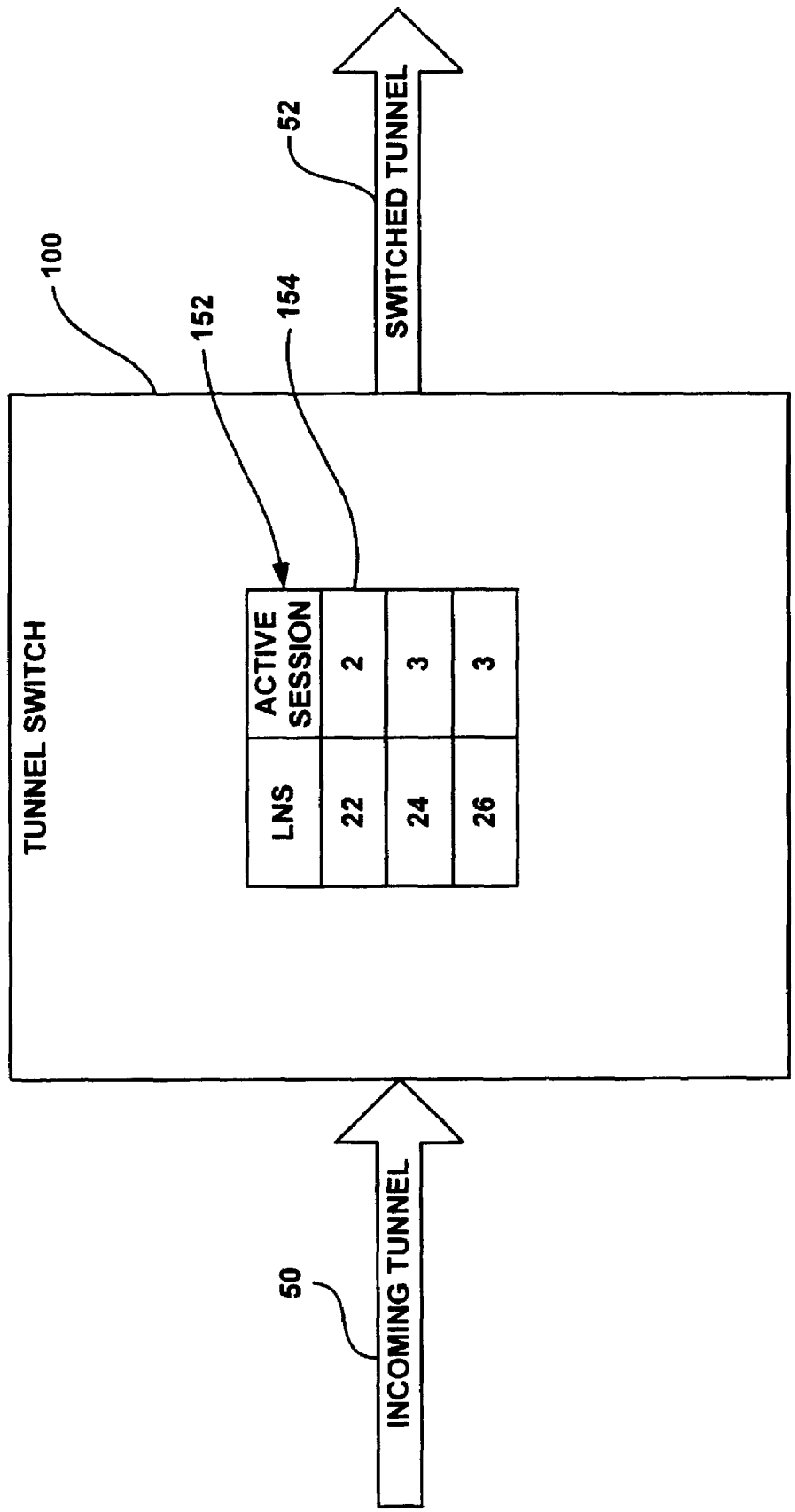
FIG. 8 diagrams the load distribution provided by the tunnel switch of FIG. 2.

Now referring to FIG. 8, the tunnel switch of the present embodiment allows load balancing to a destination network having a multiple number of access points by intelligently switching tunnels to the destination network. Preferably, this is done in one of two ways. For example, the tunnel switch 100 maintains the number of tunnels each destination resource 22, 24, 26 has active in an appropriate table. With each new tunnel session, the tunnel switch 100 switches the tunnel to the destination resource with the least number of tunnels to ensure that each destination resource 22, 24, 26 has an approximately equal number of active tunnels. Another alternate method simply tracks the last destination resource used and assigns the switched tunnel to the next destination resource in a round robin fashion. A third alternative, not illustrated here, would be to use a proprietary protocol between the tunnel switch 100 and the destination resources 22, 24, 26 to identify the load on the each destination resource. The tunnel switch 100 can then intelligently direct the switched tunnel 52 to the destination resource with the least load. In the most preferred embodiment, the dispatch process 110 maintains the information to intelligently switch tunnels to implement load balancing. Of course, other processes may be used to control the intelligent switching or other criteria may be used to appropriately implement load distribution.

FIG. 9 diagrams the bundling of tunnel connections provided by the tunnel switch. To take advantage of the high bandwidth achieved by bundling tunnel connections provided by protocols such as Multi-link PPP, a user must have multiple sessions over the same tunnel. To bundle multiple sessions from a user over the same tunnel, the user sessions must share a switched tunnel to the same destination. As described above, the tunnel switch 100 maintains an active session information table 152 for each tunnel session active. When the tunnel switch 100 is notified that a new session is being established, it examines the active session information 152 to determine if a session is already active for the user. If the user already has an active tunnel to the destination, the existing tunnel is used for the new session. In this case, the incoming tunnel user "USR" already has a switched tunnel session 154 in the active session information table 152. Accordingly, the incoming tunnel will use the existing switched tunnel for user "USR" on LAC-LNS tunnel 10-15. This is very important to support protocols such as Multi-link PPP which bundle together tunnel sessions to form a high bandwidth communication link. Multi-link PPP is discussed in Engineering Task Force publication RFC-1717, which is incorporated by reference.

Other uses and advantages of the tunnel switch are apparent to those skilled in the art. The tunnel switch also provides a bridge for establishing tunnels between two different types of networks. The tunnel switch receives an incoming tunnel from a first network (e.g. ATM) and initiates a switched tunnel to second type of network (e.g. IP). The tunnel switch provides the interface between the two types of networks.

It is to be understood that both the foregoing general description and the following detailed description are exemplary and explanatory and are intended to provide further explanation of the invention as claimed. Numerous modifications and variations are possible. It is intended that the foregoing detailed description be regarded as illustrative rather than limiting. It is the following claims, including all equivalents, which are intended to define the scope of this invention.

I claim:

1. A method of establishing a communication link from an originating user to a destination, wherein the destination has multiple access points, the method comprising the steps of:
   receiving an incoming tunnel connection from the originating user, wherein the incoming tunnel connection is associated with a first call identifier;
   in response to receiving the incoming tunnel connection, establishing an incoming tunnel, and determining that a switched tunnel is to be made to the destination in accordance with information relating to the originating user, wherein the switched tunnel is different from the incoming tunnel, the switched tunnel is associated with a second call identifier, and the second call identifier is different from the first call identifier;
   determining that the switched tunnel to the destination has not already been established;
   in response to determining that the switched tunnel to the destination has not already been established, establishing the switched tunnel to the destination;
   intelligently switching the switched tunnel to the destination, wherein the intelligent switching is in accordance with a selection among the multiple access points of the destination; and
   using the switched tunnel to the destination by switching encapsulated user data traffic from the incoming tunnel to the switched tunnel, wherein the switching involves using a lookup table when changing the first call identifier in the encapsulated user data traffic to the second call identifier.

2. The method of claim 1 wherein the step of determining that the switched tunnel is to be made comprises the steps of:
   providing a database of information relating to users originating incoming tunnel connections; and
   querying the database to obtain information relating to the user.

3. The method of claim 2 wherein the step of querying the database comprises verifying the permission of the user to determine whether the user should be switched to the destination.

4. The method of claim 3 further comprising the step of denying access to the destination if the user does not have the proper permission to access the destination.

5. The method of claim 1 wherein the intelligently switching step is in accordance with a traffic load on the multiple access points of the destination.

6. The method of claim 1 wherein the intelligently switching step is in accordance with a round robin selection among the multiple access points of the destination.

7. A tunnel switch device for establishing a tunnel connection from a user to a destination, wherein the destination has multiple access points, the method comprising:
   a termination process for receiving an incoming tunnel connection and responsively establishing an incoming tunnel that is associated with a first call identifier;
   a dispatch process in communication with the termination process for, in response to receiving the incoming tunnel connection, determining that a switched tunnel to the destination has not already been established, wherein the switched tunnel is different from the incoming tunnel, the switched tunnel is associated with a second call identifier, and the second call identifier is different from the first call identifier;
   an initiation process for establishing the switched tunnel for switching traffic on the incoming tunnel to the switched tunnel, wherein the establishing is in response to the dispatch process determining that the switched tunnel to the destination has not already been established; and
   a switching process for switching encapsulated user data traffic from the incoming tunnel to the switched tunnel by using a lookup table to change the first call identifier in the encapsulated user data traffic to the second call identifier, wherein the switching process intelligently switches the switched tunnel traffic to balance traffic load across the multiple tunnel access points.

8. The device of claim 7 wherein the switching process switches the switched tunnel traffic among the multiple tunnel access points according to a round robin mechanism.

9. The device of claim 7 wherein the switching process switches the switched tunnel traffic to one of the multiple tunnel access points of the destination according to the traffic load on the multiple tunnel access points.

10. The device of claim 7 wherein the dispatch process verifies the permission level of the user before allowing access to the destination.

11. A method of managing multiple tunnels at a tunnel switch device, wherein the tunnel switch device is communicatively coupled to an Internet Service Provider (ISP) device and to a destination network resource, wherein the destination network resource has multiple access points, the method comprising:
   receiving, at the tunnel switch device, an incoming tunnel request from the ISP device, wherein the ISP device initiates the incoming tunnel request on behalf of a user;
   in response to receiving the incoming tunnel request, establishing, at the tunnel switch device, a first tunnel between the ISP device and the tunnel switch device, wherein the first tunnel is associated with a first call identifier;
   determining that a second tunnel to the destination network resource has not already been established;

in response to determining that the second tunnel has not already been established, determining, at the tunnel switch device, to establish the second tunnel between the tunnel switch and the destination network resource, wherein the determination is made based on information associated with the user, the second tunnel is associated with a second call identifier, and the second call identifier is different from the first call identifier;

establishing, at the tunnel switch device, the second tunnel between the tunnel switch device and the destination network resource, wherein the second tunnel is intelligently switched is in accordance with a selection among the multiple access points of the destination network resource; and routing encapsulated user data traffic, received at the tunnel switch device, from the first tunnel to the second tunnel by using a lookup table to change the first call identifier in the encapsulated user data traffic to the second call identifier, thereby facilitating communication between the user and the destination network resource.

12. The method of claim 11, wherein the tunnel switch device is capable of supporting multiple incoming tunnel connections with multiple ISP devices, and wherein the tunnel switch is also capable of supporting multiple outgoing tunnel connections with multiple destination network resources.

13. The method of claim 12, wherein the tunnel switch device establishes the multiple outgoing tunnel connections with the multiple destination network resources such that traffic is balanced across the multiple destination network resources.

14. The method of claim 11, wherein routing the encapsulated user data traffic from the first tunnel to the second tunnel comprises:

the tunnel switch device receiving the encapsulated user data traffic from the first tunnel, wherein the encapsulated user data traffic includes the first call identifier;

the tunnel switch device changing the first call identifier in the encapsulated user data traffic to the second call identifier; and the tunnel switch device transmitting the encapsulated user data traffic on the second tunnel.

* * * * *